United States Patent [19]

Stansell

[11] 3,864,749

[45] Feb. 4, 1975

[54] ACTUATED SPRING MECHANISM FOR POSITIONING MAGNETIC HEADS

[75] Inventor: Alpheus F. Stansell, Thousand Oaks, Calif.

[73] Assignee: Burroughs Corporation, Detroit, Mich.

[22] Filed: Sept. 12, 1973

[21] Appl. No.: 396,478

[52] U.S. Cl. .................................. 360/103, 360/105
[51] Int. Cl. .............................................. G11b 5/60
[58] Field of Search ..................... 360/102, 3, 4, 5, 9

[56] References Cited

UNITED STATES PATENTS

| | | | |
|---|---|---|---|
| 3,123,677 | 3/1964 | Zauxen | 360/103 |
| 3,229,268 | 1/1966 | Solyst | 360/103 |
| 3,320,599 | 5/1967 | Billawala | 360/103 |

*Primary Examiner*—Vincent P. Canney
*Attorney, Agent, or Firm*—Nathan Cass; Albin H. Gess; Edward G. Fiorito

[57] ABSTRACT

A spring actuated magnetic head positioning system mounted upon an arm extending over the surface of a rotatable magnetic disk is disclosed for advancing the magnetic head into its operating position adjacent the magnetic surface. The spring positioning mechanism is contained within a housing, one end of which resiliently supports the magnetic head. The other end of the housing supports a remotely controlled actuator for actuating the spring positioning mechanism. The spring positioning mechanism is preloaded and held within a fixed and predetermined compressed length when retracted. In its operating position, the spring is translated toward the magnetic disk and further compressed to provide the force necessary to hold the magnetic head in position against the opposing force produced by the air pressure existing between the magnetic head and the rotating magnetic disk.

9 Claims, 5 Drawing Figures

ACTUATED SPRING MECHANISM FOR POSITIONING MAGNETIC HEADS

BACKGROUND OF THE INVENTION

This invention relates to actuating devices for magnetic heads, and, in particular, to a controlled spring mechanism for positioning a magnetic head adjacent a rotating magnetic medium.

Numerous arrangements exist in the magnetic recording art for positioning a magnetic head toward or away from a rotating magnetic medium. Magnetic heads have been positioned by mechanical arms controlled by electric actuators, by mechanical displacement employing levers and cams, as well as by pneumatically actuated diaphrams, just to name a few. The type of positioning system desired for a given magnetic storage system is dependent upon a variety of factors such as reliability, simplicity, repeatability, accuracy, as well as low cost. One example of a widely used pneumatically actuated head positioning mechanism for a disk file storage system is illustrated in a group of U.S. patents including my U.S. Pats. Nos. 3,310,792 and 3,678,480 and U.S. Pat. No. 3,320,599 to S. A. Billawala.

One of the major problems encountered in a head positioning system is that of setting and maintaining the applied force urging the head toward the surface of a rotating disk so as to maintain a desired minimum spacing between the head and the magnetic surface. The force urging the head toward the surface of the disk is opposed by a force created by air pressure between the face of the head and the surface of the disk as a result of the rotation of the disk. The balance between these two opposing forces is delicate and this balance is a primary factor in determining the spacing between the head and the rotating disk. Accordingly, the heads are advanced into their operating or "flying" position only after the magnetic disk is brought up to operating speed.

The use of a pneumatically actuated diaphram for advancing the magnetic head into its operating position has not been entirely free of problems. One of the problems encounterd in this system is that of accurately controlling the magnitude of the force applied to the magnetic head. This applied force is subject to undesired variations caused in part by fluctuations in control air pressure produced by a closed-end air regulation system, the inability to control the spring rates of flexible diaphrams, and the contamination occurring in the air system including the check valves and air regulator seats. These disadvantages of the pneumatic actuating system have led to the improved head positioning system of the present invention.

A system for positioning a magnetic head in close proximity to the surface of a revolving drum employing a manually adjustable coil spring is illustrated in U.S. Pat. No. 3,351,925. A system for advancing a magnetic head toward or away from a revolving disk employing a pair of opposed flat leaf springs is illustrated in U.S. Pat. No. 3,491,350. The present invention is an improvement over the abovementioned systems in the use of a pre-loaded or compressed spring element which is positionable toward or away from a revolving disk under the control of a remote acutating device, as will be more fully explained hereinafter.

A principal object of this invention is to provide an actuated spring mechanism for advancing a magnetic head into position adjacent the surface of a revolving magnetic medium.

Another object of this invention is to provide a spring force upon a flying magnetic head which is independent of the force controlling the position of an actuating spring.

Yet another object of this invention is to provide an actuating force upon a magnetic head which is independent of the variations in pneumatic pressure of a pneumatic control system.

Still another object is to provide a force upon a flying magnetic head of a disk file system which can be accurately determined and held at a desired value for long periods of service.

BRIEF DESCRIPTION OF THE INVENTION

The spring actuated magnetic head positioning system of this invention is contained within a housing which is mounted on an arm extending over the surface of a rotatable magnetic disk. The magnetic head itself is resiliently mounted by means of a flat gimbal spring on one end of the housing. The housing contains a coil spring compressed and retained between a piston and a movable member. The amount of compression and the compressed length of the spring is determined by a mechanical intercoupling between the piston and the movable member. The coil spring assembly with piston and movable member is slideably mounted within the housing to move along an axis perpendicular to the surface of the rotatable disk. A piston pin is slideably mounted within the housing and one end extends through the one end of the housing to engage the center of the flat gimbal spring. The other end of the piston pin engages the center of the piston. The length of the piston pin and the dimensions of the coil spring assembly with piston and movable member are such as to hold the movable member at a first position against a mechanical stop. This first position of the coil spring assembly establishes the retracted or non-flying position of the magnetic head relative to the magnetic disk.

The outer or remote end of the housing supports a controllable actuator which may be pneumatically or electrically energized. This controllable actuator engages the movable member and is adapted, when energized, to translate the movable member toward the magnetic disk until the movable member reaches a second stopped position. In this second position, the coil spring is further compressed thereby causing an increased force to be applied to the piston. This increased force moves the piston along with the piston pin thereby advancing the magnetic head toward the rotatable magnetic disk. The controllable actuator is energized after the rotatable magnetic disk has been brought up to operating speed, thereby positioning the magnetic head into its operating or flying position.

In the operating or flying position of the magnetic head, the force urging the head toward the revolving magnetic disk is determined solely by the force produced by the compressed spring. The opposing force urging the head away from the disk is produced by the air pressure existing between the head and the disk as a result of the rotation of the magnetic disk.

THE DRAWINGS

DETAILED DESCRIPTION OF THE INVENTION

Figure 1:
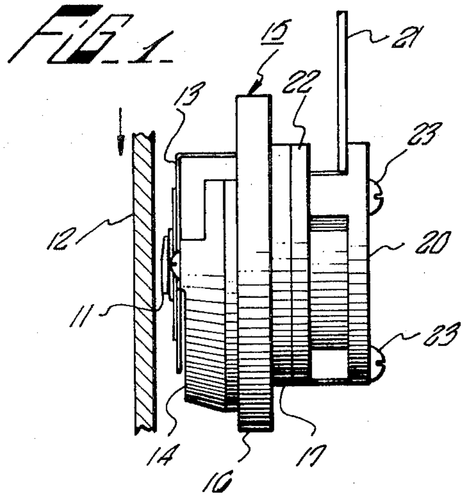
FIG. 1 is a side view of a pneumatically actuated, spring positioning mechanism for advancing a magnetic head in accordance with the invention.
Figure 2:
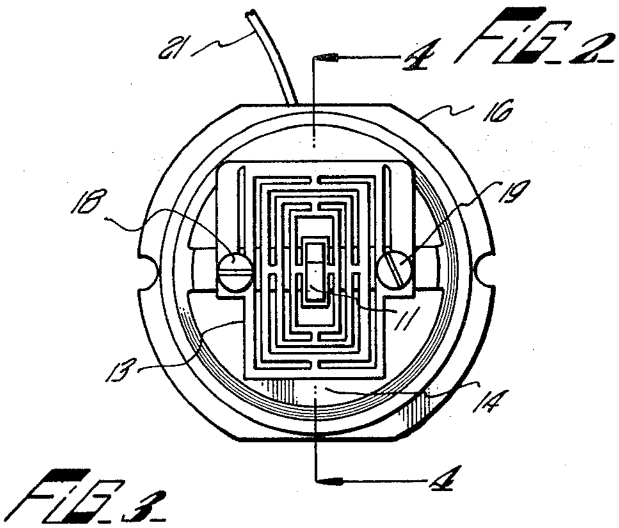
FIG. 2 is a front view of the head positioning mechanism of FIG. 1.

Referring to FIG. 1, a side view of a pneumatically actuated, spring positioning mechanism of this invention is shown for positioning magnetic head 11 adjacent the magnetic surface of a revolving disk 12. The magnetic head is mounted at the center of a flat gimbal spring 13 as illustrated in the front view of FIG. 2 and as described in my prior U.S. Pats. Nos. 3,310,792 and 3,678,480. Gimbal spring 13 is attached to a first end 14 of a circular housing 15, consisting of two halves 16 and 17, by means of screws 18, 19 as illustrated in FIG. 2. A sealed, hollow air chamber 20 having an inlet through tube 21 is attached to the second end 22 of housing 15 by means of screws 23. Air under pressure from a remotely controlled source enters tube 21 to actuate the spring positioning system to advance head 11.

Figure 3:
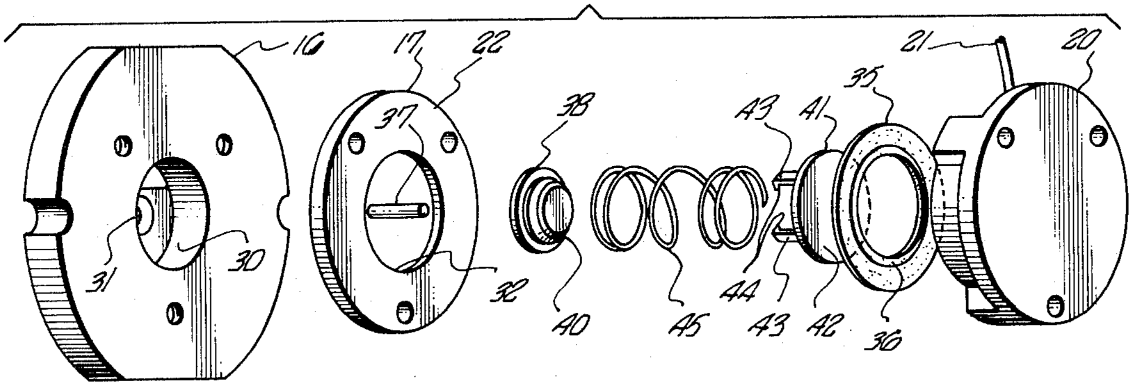
FIG. 3 is an exploded view of the elements of the head positioning mechanism of FIGS. 1 and 2.

As illustrated in FIG. 3, the first half 16 of circular housing 15 is provided with a central cylindrical chamber 30 and an axial aperture 31. The second half 17 of housing 15 is of annular construction having a central opening 32 of larger diameter than that of cylindrical chamber 30. The circular rolled portion 36 of a flexible diaphram 35 is designed to fit within central opening 32 of the half 17 of housing 15. A piston pin 37 is designed to slideably fit within the axial aperture 31 of the half 16 of housing 15, as illustrated in FIG. 4.

A compressed coil spring assembly illustrated in the exploded view of FIG. 3 is designed to be slideably mounted within the central cylindrical chamber 30 and the central opening 32 of the housing 15. This spring assembly consists of a circular piston 38 having a recessed central portion 39 at one end for engaging one end of piston pin 37, and a circular flange portion 40 of reduced diameter at its other end. A movable member 41 having a smooth outer end 42 with three axially projecting fingers 43 with inwardly extending tips 44 is designated to form a mechanical intercoupling with the flange portion 40 of piston 38. The diameter of the outer end 42 of movable member 41 is larger than the diameter of the central cylindrical chamber 30 for reasons that will become apparent hereinafter. A coil spring 45 with internal diameter selected to allow the spring to surround the three axially projecting fingers 43 is compressed between the inner surface of piston 38 and the inner surface of movable member 41, as illustrated in FIG. 4. The coil spring is held in compression between the piston 38 and movable member 41 by virtue of the interlocking relationship between the inwardly extending tips 44 on fingers 43 and the circular flange portion 40, as shown in FIG. 4.

Figure 4:
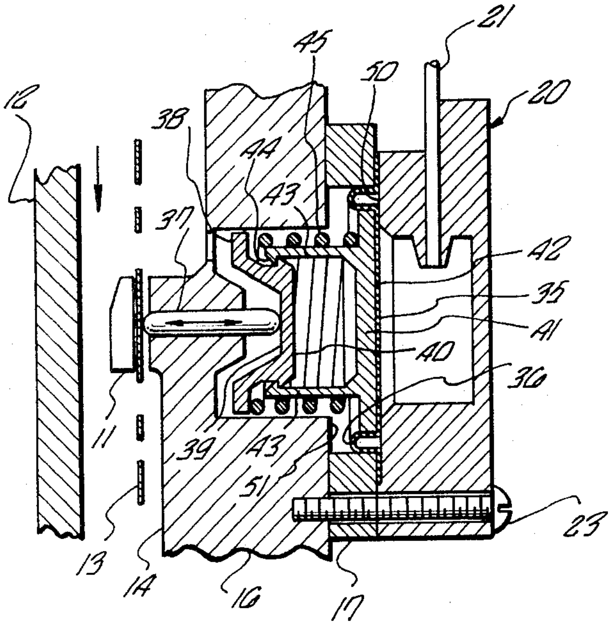
FIG. 4 is an enlarged sectional view of the invention taken along the lines 4—4 of FIG. 2.

The cross-sectional view of FIG. 4 shows the assembled head positioning mechanism of the invention in the retracted or non-operating position. Air from a pneumatic pressure system, not shown, passes through tube 21 into the hollow air chamber 20 to provide a force upon the flexible diaphram 35 to translate movable member 41 from a first position, as shown, to a second position closer to the rotating disk 12. The first position of movable member 41 is established by the smooth outer end 42 of movable member 41 being pressed against the flexible diaphram 35 which, in turn, is held sealed by the inner flat surface 50 of the hollow air chamber 20. This inner flat surface 50 serves as a stop, preventing any outward movement of the movable member 41. The force acting upon the compressed coil spring assembly to hold movable member 41 in this first position is produced by the gimbal spring 13 acting through piston pin 37 against piston 38. This force is relatively small and is insufficient to overcome the spring force of compressed spring 45. Spring 45 is, accordingly, held in its compressed state by the interlocking of the inwardly extending tips 44 of movable member 41 and the circular flange portion 40 of piston 38.

To advance magnetic head 11 toward the revolving disk 12, air pressure within hollow air chamber 20 is permitted to build up to that level sufficient to overcome the force of gimbal spring 13 in which case a small movement of the head 11 toward the disk 13 will take place. As the head 11 advances toward the revolving disk 12, a much larger force opposing this advance occurs as a result of increasing air pressure building up between head 11 and revolving disk 12. The air pressure within hollow chamber 20 must continue to increase to further advance head 11 toward disk 12. As this occurs, the force exerted by the increased air pressure within air chamber 20 against the smooth outer end 42 of movable member 41 produces a translation of movable member 41 from its first position to a second position established by a stop 51. Stop 51 is located at the outer surface of the first half 16 of housing 15, as shown in FIG. 4. The amount of force required to translate moveable member 41 against stop 51 is greater than the opposing force exerted by the air pressure between the revolving disk 12 and head 11. In practice, the amount of force produced by the air pressure within hollow air chamber 20 is selected to be appreciably greater than that produced by the air pressure between revolving disk 12 and the magnetic head 11 so as to insure that movable member 41 is positioned and held against stop 51 during the operating or "flying" position of head 11.

In the flying position of head 11, the amount of opposing force produced by the air pressure between revolving disk 12 and the head 11 is greater than the force produced by the compressed spring 45. As a result, this opposing force acting through piston pin 37 upon piston 38 is sufficient to produce further compression of spring 45, thereby disengaging the mechanical intercoupling between piston 38 and movable member 41. Disengagement of the mechanical intercoupling frees the mechanical contact between the inwardly extending tips 44 of movable member 41 with circular flange portion 40 of piston 38. The force now acting upon piston 38 urging piston pin 37 and head 11 toward revolving disk 12 is determined solely by the compressed coil spring 45.

The opposing force acting upon the face of head 11 as a result of the rotation of disk 12 is determined by the speed of rotation of the disk, the cross-sectional area of the face of the head, the shape of the face of the head, the spacing between the head and the disk, and other secondary factors. The spacing between the face of the head and the surface of the magnetic disk in the operating or flying position may be as small as 25 to 35 micro-inches. In the operating position, the compressed coil spring must furnish the necessary force to hold this spacing within this 25 to 35 micro-inch range. For one type of magnetic head with a cross-sectional area of three-sixteenths by one-half inch, a spring force of approximately 8 to 10 pounds was found to be required. To achieve this force, a coil spring of five-eighths inch diameter and approximately 1 ¾ inches in length before compression was compressed between piston 38 and movable member 41 to a length of approximately three-quarters of an inch.

A number of important advantages are achieved by the compressed coil spring positioning system of this invention. The amount of spring force required to hold the desired spacing of a given head design can be more accurately pre-set before assembly and, by virtue of the compression, this pre-set force can be maintained over very long periods of time. Additionally, the compression of a long coil spring into a shorter spring produces a spring with a flatter rate of change of force produced as a function of change in spring length. Accordingly, as the compressed coil spring assembly is advanced into the flying head position, the small additional compression of the spring which produces a corresponding small reduction in its length causes only a relatively small increase in the compressed spring force. This desirable characteristic provides the head positioning system of this invention with increased uniformity, reliablity, accuracy, and long life.

Figure 5:
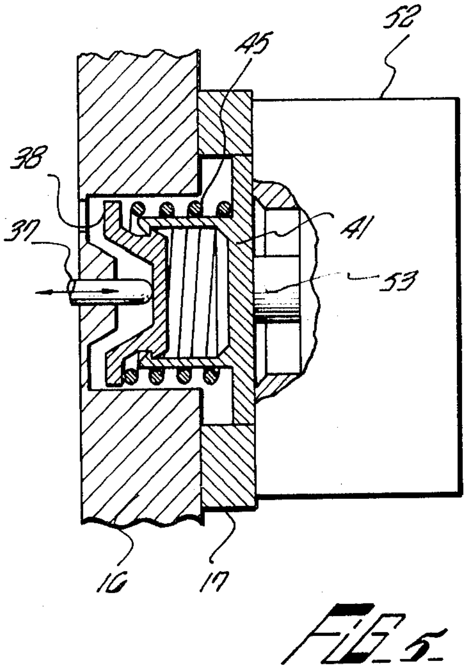
FIG. 5 is an enlarged sectional view of an alternative embodiment of the invention using an electromagnetic actuator for positioning the spring.

It is apparent that the present invention is not limited to the preferred embodiment illustrated in FIGS. 1–4. For example, the coil spring assembly may be translated by an electromagnetic actuator as shown in FIG. 5. In this embodiment, a solenoid 52 is attached to the second end 22 of housing 15. Plunger 53 of solenoid 52 engages directly the center of smooth outer end 42 of movable member 41. Energizing solenoid 52 causes plunger 53 to advance movable member 41 against stop 51, thereby positioning head 11 into its operating position.

It is also apparent that the first and second positions of the movable member 41 may be determined by means other than the inner flat surface 50 and the stop 51. For example, solenoid 52 could be arranged such that plunger 53 is translated between first and second positions as a result of its internal design.

The present invention is not limited to the use of a coil spring. Other spring means such as a series of stacked, cup-shaped, flexible steel washers may be employed if desired.

Since many changes can be made in the abovedescribed apparatus and many different embodiments of this invention could be made without departing from the scope thereof, it is intended that all matter contained in the above description or shown in the accompanying drawings shall be interpreted as illustrative and not in a limiting sense.

What is claimed is:

1. An actuating device for moving a magnetic head toward or away from a magnetic medium comprising in combination:

a. spring means having first and second ends, both said first and second ends being movable toward or away from said magnetic medium;

b. a first movable member adjacent the first end of said spring means, said first movable member being adapted for coupling the first end of said spring means to said movable head;

c. a second movable member adjacent the second end of said spring means, said second movable member being adapted for moving the second end of said spring means between first and second positions, the second position of the second end of said spring means being closer to said magnetic medium than the first position of the second end of said spring means;

d. means mechanically intercoupled between said first and second movable members for maintaining said spring means in compression and setting the maximum spacing between the first and second ends of said spring means; and e. controllable means coupled to said second movable member for moving said second movable member between said first and second positions, said second position being chosen so that the force urging said head towards said medium at said second position is substantially independent of said controllable means.

2. The actuating device as defined by claim 1 wherein said actuating means comprises a pneumatically controllable means coupled to said second movable member for moving said second movable member between said first and second positions.

3. The actuating device as defined in claim 1 wherein said controllable means comprises an electromagnetically controllable means coupled to said second movable member for moving said second movable member between said first and second positions.

4. The actuating device as defined by claim 1 wherein said spring means is a coil spring.

5. The actuating device as defined by claim 1 wherein said first movable member adjacent the first end of said spring means includes a piston slideably mounted to move toward or away from said magnetic head and a piston pin located between said piston and said magnetic head.

6. The actuating device as defined by claim 5 further comprising housing means for supporting and guiding said first movable member including said piston and said piston pin, said housing means including stop means for determining the second position of the second end of said spring means.

7. The actuating device as defined by claim 6 wherein the movable magnetic head is resiliently mounted to said housing means adjacent one end of said piston pin.

8. The actuating device as defined by claim 6 comprising controllable means for moving said second movable member toward or away from said magnetic medium causes the second end of said spring means to move between said first and second positions.

9. An actuating device for moving a magnetic head toward or away from a magnetic medium comprising in combination:

a. housing means having first and second ends;

b. resilient means for mounting said magnetic head to the first end of said housing means;

c. a coil spring situated within said housing means, said coil spring situated within said housing means, said coil spring having first and second ends, the axis of said coil spring extending perpendicular to the surface of the magnetic medium;

d. piston means slideably mounted within said housing means between the first end thereof and the first end of said coil spring;

e. a piston pin slideably mounted within said housing means and extending between said piston means through the first end of said housing means to said resiliently mounted magnetic head;

f. a movable member slideably mounted within said housing between the second end thereof and the second end of said coil spring;

g. means mechanically intercoupled between said piston means and said movable member for compressing said coil spring and setting the maximum spacing between the first and second ends of said coil spring; and h. controllable means attached to said housing means, said controllable means being coupled to said movable member for moving the second end of said coil spring between first and second positions.

* * * * *